Oct. 22, 1940.    A. W. GERBER    2,219,227
JOINT FOR FLEXIBLE SPOUTING
Original Filed June 12, 1939    2 Sheets-Sheet 1

Inventor
Addington W. Gerber
By Edward C. Walsh
Attorney

Oct. 22, 1940.  A. W. GERBER  2,219,227
JOINT FOR FLEXIBLE SPOUTING
Original Filed June 12, 1939  2 Sheets-Sheet 2
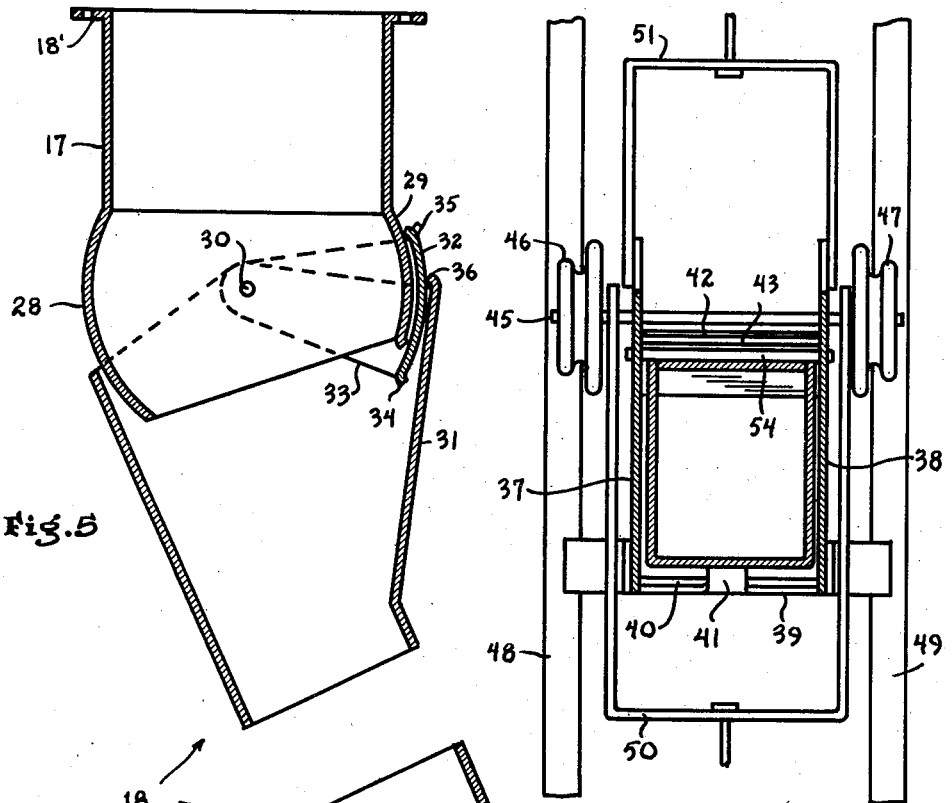
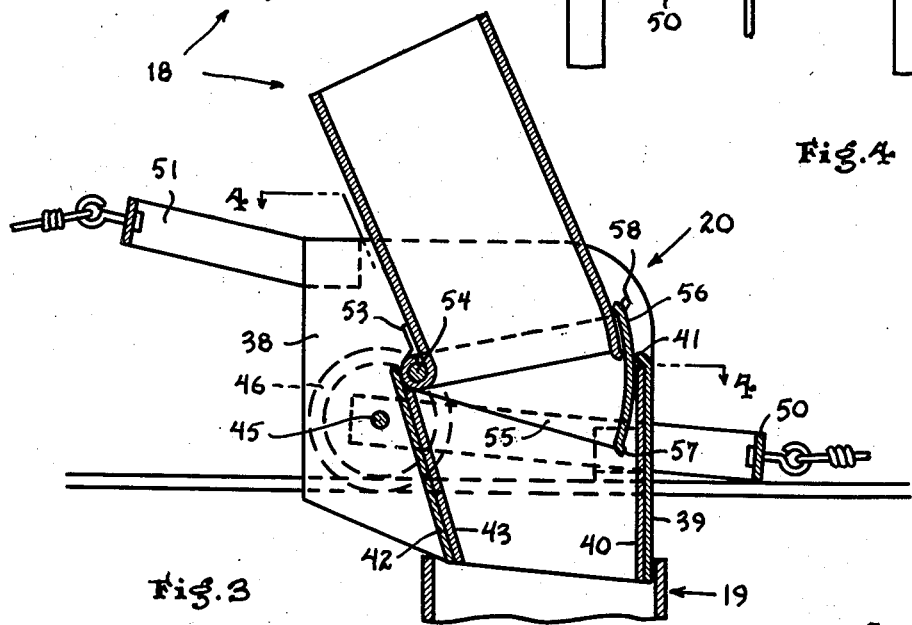
Inventor
Addington W. Gerber
By Edward C. Walsh
Attorney Patented Oct. 22, 1940

2,219,227

UNITED STATES PATENT OFFICE 2,219,227

JOINT FOR FLEXIBLE SPOUTING

Addington W. Gerber, St. Louis Park, Minn.

Original application June 12, 1939, Serial No. 278,605. Divided and this application September 27, 1939, Serial No. 296,790

1 Claim. (Cl. 285—212)

My invention relates to grain handling equipment and deals particularly with improvements in flexible spouting and extensible joints forming part of such equipment.

This application is a division of the co-pending application Ser. No. 278,605 filed June 12, 1939.

In grain elevators it is customary to deliver grain from an elevated hopper or the like down to any one of a plurality of bins or other receptacles at a lower point. This necessitates usually the use of extensible spouting having flexible joints to permit of adjustability of the lower end of the downspout, that is, the point of delivery of grain.

The primary object of the present invention is to provide improvements in the flexible joints in grain spouts as above described with the end in mind of rendering the spouts as dust tight as possible. Dust escaping from grain equipment presents an additional fire hazard, is detrimental to health, and contributes to the deterioration of equipment and so its abatement is of considerable importance. Flexible joints for use in metal downspouts have heretofore been proposed but such known constructions have been deficient in not being fully dust tight in all of their adjusted positions. My invention comprehends a flexible joint having a considerable range of adjustment but wherein the joint is substantially dust tight throughout its entire range of adjustment.

Another object of my invention is to provide a flexible joint in metal spouting which employs a minimum number of parts and offers the maximum in ease and facility of manufacture without detracting from the dust tightness and wearing qualities of the spout.

Another object of my invention is to improve the wearing qualities and utility generally of flexible joints in grain spouting.

While my invention is particularly adapted to and has primary utility in the art of grain handling it may have other applications.

For a better understanding of my invention reference may be had to the following detailed specification and annexed drawings wherein:

Figure 3 is a detailed cross sectional side view of the truck on which the lower end of the downspout is carried.

Figure 4 is a view taken along the line 4—4 of Figure 3.

Figure 5 is a detailed view of the upper flexible joint of the downspout.

Figures 1, 2:
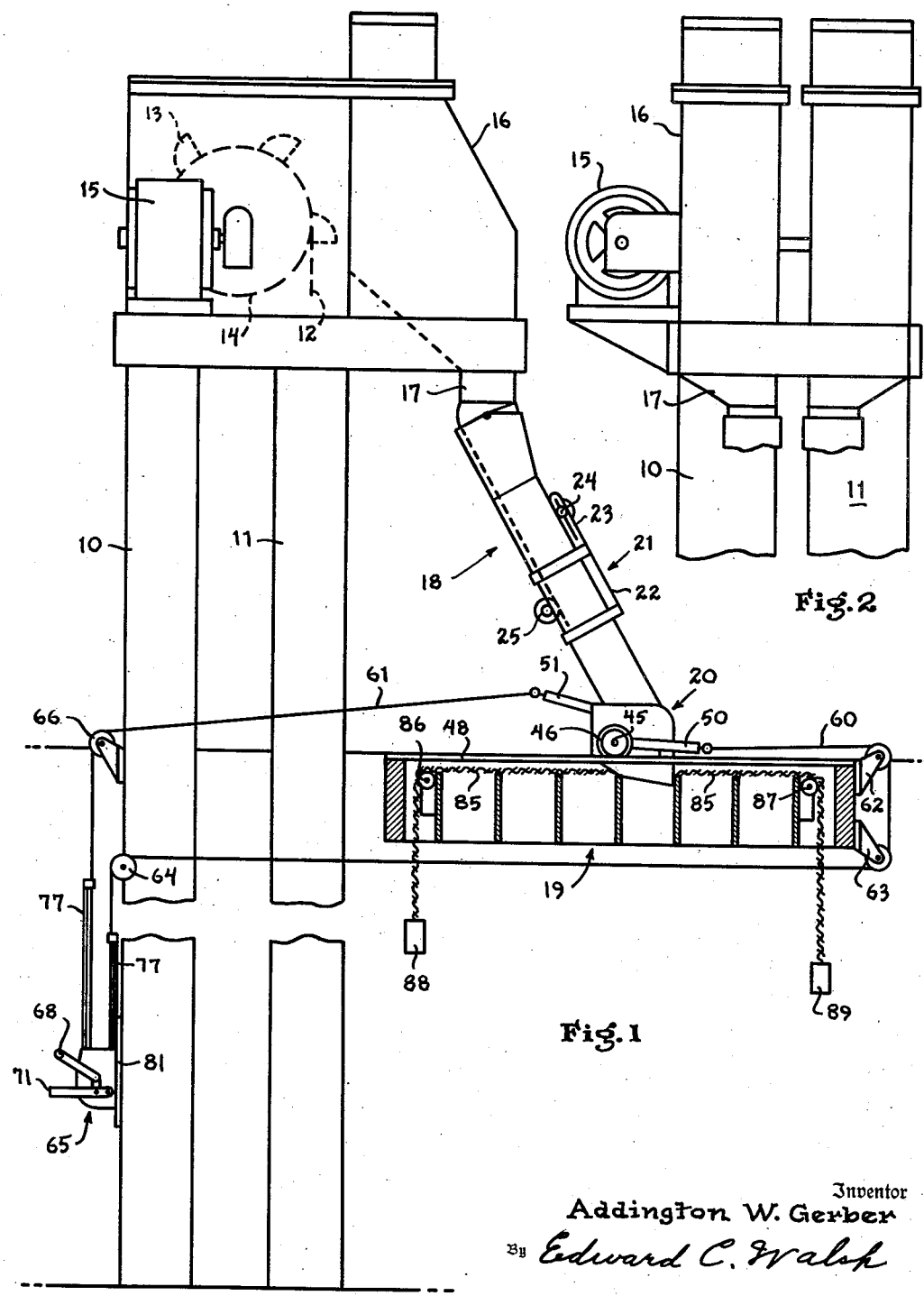
Figure 1 is an assembly of a pair of elevator legs, a hopper, and a flexible downspout delivering grain to a plurality of bin inlets.
Figure 2 is another view of the upper part of Figure 1.

Referring to Figure 1 of the drawings, numerals 10 and 11 indicate elevator legs of a type commonly employed in elevators wherein grain is elevated to a high point in the elevator. The legs 10 and 11 serve as housings for an endless conveyor belt 12 having uniformly spaced grain buckets 13 attached thereto, the conveyor belt passing over a suitable pulley or the like 14. The conveyor belt is driven by any suitable means such as an electric motor 15 and delivers the elevated grain into a hopper designated at 16. In equipment of this type it is customary to have a pair of hoppers of similar construction located adjacent each other as shown in Figure 2, there being separate conveying apparatus for each of the hoppers.

The lower portion of the hopper 16 is tapered and connects to a vertical spout or conduit section 17 into which the grain is fed from the hopper. Numeral 18 designates generally a downspout for conveying grain from the hopper to any one of a plurality of bin inlets arranged in a horizontal plane as designated at 19. The upper end of the downspout 18 is pivotally connected to the spout section 17 to permit relative movement of the downspout with respect to the section 17. It is to be understood of course that the lower end of the downspout is adjustable to the right and left, being carried on a truck 20 so that the lower end of the downspout may be brought into registry with any one of the bin inlets 19. To provide for movement of the lower end of the downspout with respect to the bin inlets an exhaustible joint or coupling 21 is provided in the downspout. The details of the extensible coupling 21 form no part of my invention and reference may be had to the patent of F. W. Cooley No. 1,395,947 for a more detailed showing of the extensible coupling. As disclosed, the coupling comprises a bracket member 22 fastened to the lower section of the downspout and having an arm 23 carrying a roller 24 with respect to which the upper section of the downspout is adapted to move relatively. The lower section of the downspout also carries a roller 25, part of which extends through an opening in the lower spout section and with which the upper spout section is adapted to move in contact.

For the details of the flexible joint in the upper end of the downspout and the truck assembly reference may be had to Figures 3, 4 and 5 of the drawings. Figures 3 and 5 show the upper and lower ends of the downspout without showing the intermediate section having the extensible coupling 21. In Figure 5 it will be seen that the spout section 17 is generally circular and has a flange 18' attachable to the lower end of the hopper. The lower part of the section 17 has surface portions 28 and 29 of curved configuration, the center of curvature being at the pivot point 30. The curved portion 28 is of slightly greater extent than the curved portion 29. The sides of the section 17 in which the ends of the pivot 30 are journalled are flat. The upper end of the downspout 18 is tapered as shown at 31, the upper end of the downspout also having flat sides similarly to the section 17 in which the ends of the pivot 30 are journalled. It will be seen that the upper end of the downspout 18 has an edge portion which is closely juxtaposed to the surface portion 28 of the curved configuration and remains closely juxtaposed thereto when the downspout 18 is rotated relatively to the section 13 about the pivot 30. The tapered portion 31 of the downspout 18 is spaced somewhat from the portion 29 of curved configuration and interposed therebetween is a curved surface portion 32 forming part of an element or member 33 having flat side portions in the shape of sectors which are also carried on the pivot 30. The curved surface portion 32 is contiguous to the surface portion 29 and as seen on Figure 5 is closely juxtaposed thereto. The tapered portion 31 of the downspout 18 has an inturned flange or ear 36 adapted to engage corresponding ears 34 and 35 on element 33. It will be seen, therefore, that when the downspout 18 is rotated in a clockwise direction sufficiently so that there would otherwise be an open gap between the upper edge of the portion 31 and the lower edge of the curved portion 29, the ear 36 will have engaged the ear 34 of the member 33 and moved said member in a clockwise direction about its pivot so that the curved surface portion 32 spans the gap between the upper edge of portion 31 and the lower edge of portion 29. It is to be seen, therefore, that by reason of the structure just described, the downspout 18 may be rotated a substantial amount to the right with the parts of the flexible joint remaining substantially dust tight and that the downspout 18 may be adjusted a substantial amount to the left with the parts of the flexible joint still maintaining the joint as a whole substantially dust tight. It is pointed out that the curved portion 29 is not of the same extent as the curved portion 28 to avoid placing an undue amount of obstruction to the flow of grain from the section 17 into the downspout 18 which it would otherwise do. With the construction shown, the downspout is adjustable a considerable amount to the left of a vertical line through the pivot 30 without the elements of the flexible joint presenting an undue amount of obstruction to the flow of grain from the section 17 into the downspout. By avoiding having portions of the flexible joint extend unduly into the path of flowing grain, the wearing qualities of the joint and the conveying means as a whole are considerably improved.

As stated above, Figure 3 of the drawings shows the details of the lower end of the downspout and the truck which supports it and by which it is adjustable. The truck 20 comprises a chassis composed of a frame having sides 37 and 38 (see Figure 4). The front of the frame is formed of two superimposed sheets of metal 39 and 40 of slightly less vertical extent than the side walls 37 and 38, the sheet 39 having an inturned ear 41. The truck frame has a rear wall or side portion comprised of two superimposed sheets of metal 42 and 43 lying in a plane perpendicular to the plane of the side walls 37 and 38 but disposed at an angle to the plane of the front wall as shown. The chassis or frame of the truck may preferably be of welded construction or any other suitable method of fabrication may be utilized. Journalled in the side walls 37 and 38 are the ends of an axle 45 on the ends of which are carried caster wheels 46 and 47 adapted to run upon tracks 48 and 49 (see Figures 1 and 4). The axle 45 passes through the ends of a U-shaped bail 50, the sides of the bail being disposed on opposite sides of the truck frame. Numeral 51 designated a similar bail, the legs of which are attached to the side walls 37 and 38 at their upper rear portions by welding or the like. The bails 50 and 51 may be also seen on Figure 1.

Formed at the lower part of the left side of the end of the downspout 18 is a bracket 53 formed so as to journal therein a shaft 54, the ends of which are also journalled in the side walls 37 and 38 of the truck frame. Obviously by reason of the structure just described the downspout 18 is pivotally connected to the truck 20. The end of the downspout 18 fits fairly snugly between the side walls 37 and 38 of the truck frame, but the front edge of the downspout 18 is spaced slightly from the front wall of the truck as shown. Numeral 55 designates a member pivoted on the shaft 54 and corresponding very much in structure to the member 33 of Figure 5, the member 55 having a curved surface portion 56, the center of curvature being at the shaft 54. The surface portion 56, as shown, is interposed between the leading edge of the lower end of the downspout 18 and the front wall of the truck 20. The member 55 has an ear 57 at the lower edge of the curved surface portion 56 and an ear 58 at the upper edge of the curved surface portion 56. Thus similarly to the action of the flexible joint of Figure 5, when the truck 20 is moved forward so that the downspout rotates in a counter-clockwise direction with respect to shaft 54, the ear 41 may engage the ear 57 so as to move the member 55 about shaft 54 in a direction to cause the curved surface portion 56 to bridge or span the gap between the upper edge of the front wall of the truck and the leading edge of the lower end of the downspout 18. This construction, as described more in detail with respect to Figure 5, maintains the flexible connection between the downspout and the truck substantially dust tight without unduly interposing obstructions in the path of flow of the grain from the downspout into the truck.

Normally the front wall of the truck 20 abuts against a partition between the various bin inlets 19 as shown on Figures 1 and 3. The bottom of the rear portion of the side walls 37 and 38 slants upwardly somewhat as seen in Figure 3, and rest on one of the partitions between adjacent bin inlets 19.

The form of my invention which I have disclosed is representative of a preferred manner of practicing it, and discloses it in sufficient detail so that those skilled in the art will be enabled to make, use and compound the same. It is to be understood that there are various departures from the structure as shown which may be made by those skilled in the art but which clearly fall within the realm of my invention. It is to be understood, therefore, that I am to be limited only by the scope of the appended claim rather than by my disclosure.

I claim as my invention:

In apparatus of the character described, in combination, a conduit section, another conduit section associated with said first conduit section in continuous conduit forming relation, pivot means connecting said conduit sections permitting relative movement of said sections, one of said sections having curved surface portions, the axis of curvature passing through said pivot means, said other conduit section having an edge portion arranged in juxtaposition to one of said curved surface portions, said edge remaining closely adjacent said curved surface portion during a substantial amount of relative rotation of said sections, an intermediate member carried by said pivot means and having a curved surface portion concentric with said first named curved surface portion throughout its area and interposed between said first curved surface portion and said edge, and inter-engaging means between said second conduit section and said intermediate member whereby said member is moved to span the gap between said one curved portion and said edge when said sections are moved relatively beyond a predetermined limit, and whereby said member moves away from a position obstructing flow through said conduit sections when the sections are moved relatively in a direction to bring their axes into alignment.

ADDINGTON W. GERBER.